UNITED STATES PATENT OFFICE.

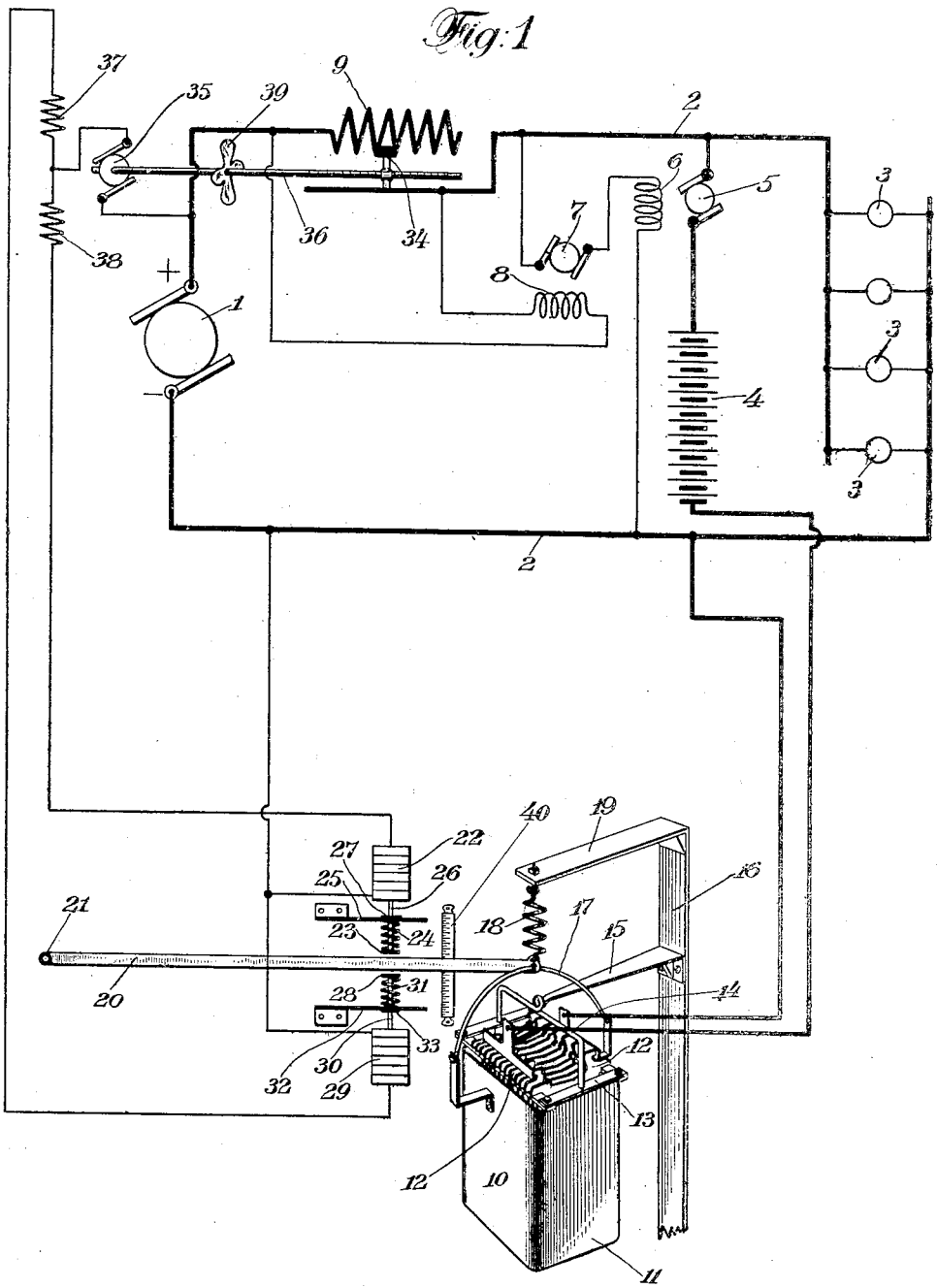

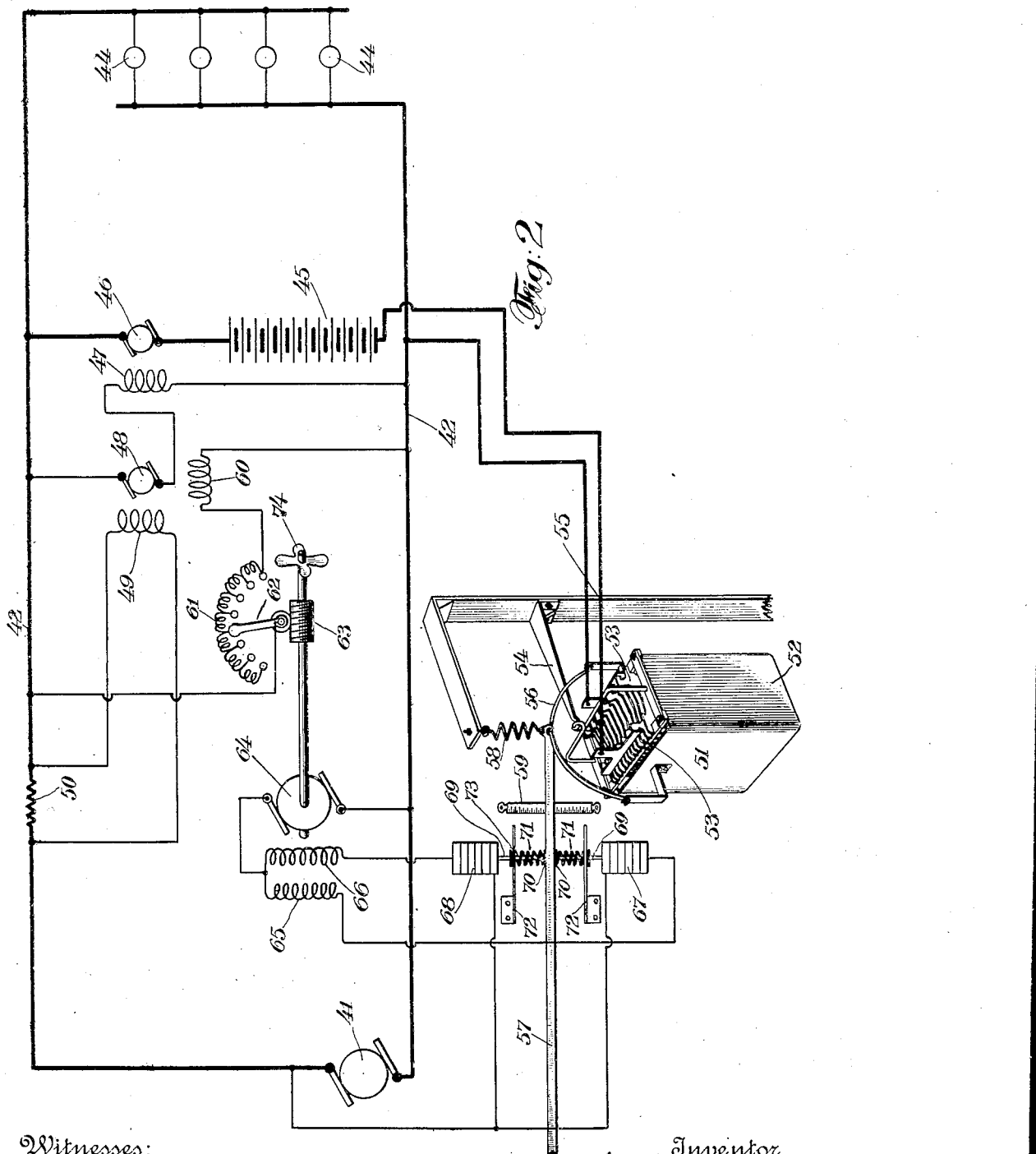

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,204,155.  Specification of Letters Patent.  Patented Nov. 7, 1916.

Application filed January 25, 1910. Serial No. 539,920.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to improvements in electrical systems of distribution in which a suitable compensatory storage apparatus is employed and more especially to systems of this class in which the compensatory storage apparatus is in the form of a storage battery and in which special regulating apparatus is employed to control the charge and discharge of the battery.

One object of my invention is to provide a system of this class in which the battery charge and discharge is suitably controlled and in which special apparatus is provided to cause the battery to tend to return to some predetermined condition or state of charge after it has departed therefrom.

A further object of my invention is to provide an efficient arrangement for indicating visually the condition or state of charge of the storage battery.

A further object of my invention is to provide such an arrangement which is not disadvantageously affected by temperature changes and which is especially economical and efficient in construction and operation.

Further objects, features and advantages will more clearly appear from the detailed description given below taken in connection with the accompanying drawings which fully and clearly explain two systems embodying preferred forms of my invention.

In the drawings, Figure 1 is a diagram of a system embodying one form of my invention, and Fig. 2 is a similar diagram showing a modified form of my invention.

Referring to Fig. 1, 1 represents a main generator feeding the main distribution circuit 2, 2 and its load, which may consist of lamps or other translating devices 3, 3. Connected across the circuit 2, 2 is the usual storage battery 4 and in series therewith a booster 5. The booster 5 is provided with a field 6 connected across the mains 2, 2 in series with a counter machine 7. The counter machine 7 is provided with a field 8 connected across a resistance 9 in the main circuit 2.

In the ordinary operation of the system any variation of load upon the generator 1 produces a variation of current in the coil 8 which affects the voltage of the counter machine 7, so that the excitation of the booster 5 is changed, thereby causing the booster to produce a voltage which will cause the battery to charge or discharge in accordance with the needs of the system.

At 10 I have shown one of the cells of the storage battery 4. This cell may consist of a suitable container 11 for the liquid or electrolyte thereof, and suitable plates 12. The plates 12 are supported upon a frame 13, which frame is in turn supported by a member 14 which hangs upon an arm 15 fixed to a stationary support 16. The container 11 is supported by a suitable bail 17, which in turn is supported by a spring 18 having its other end fixed to an arm 19 secured to the support 16. The lower end of the spring 18 and the bail 17 are secured together by being passed through apertures in one end of an arm 20, the other end of the arm 20 being pivoted at 21 to some suitable support. The arm 20 when moved upwardly is arranged to compress the blocks of a carbon pile resistance 22. For this purpose the arm engages a plate 23 normally held downwardly by means of a spring 24 which is coiled between the plate 23 and the fixed member 25 about a rod 26. A plate 27 secured to the rod 26 sets a limit to the expansion of the resistance 22 by coming into contact with the fixed member 25. The rod 26 is arranged to slide freely through an opening in the fixed member 25. In a similar manner when the arm 20 moves downwardly it strikes a plate 28 which acts to compress the blocks of the carbon pile resistance 29 by means of the rod 30. A spring 31 coiled about the rod 30 between the plate 28 and the fixed member 32 acts to oppose this motion of the member 20. A plate 33 rigidly secured to the rod 30 sets a limit to the expansion of the carbon pile resistance 29.

The amount of resistance 9 in the circuit 2 may be varied by moving contact point 34. This movement is accomplished by the rotation of a motor 35 and screw shaft 36. The motor 35 is connected across the mains 2, 2 and provided with two series fields 37 and 38. Fields 37 and 38 are oppositely wound, the field 37 having the carbon pile resistance 29 in series therewith and the field 38 having the carbon pile resistance 22 in series therewith. Under normal conditions with the carbon pile resistances 22 and 29 in their expanded positions the strength of coils 37 and 38 is the same and therefore the field strength of the motor 25 is *nil* and the motor will not rotate.

When the battery has become discharged under the action of the regulating apparatus 5, 6, 7, 8 and 9 it is often desirable that the same be brought back to a condition of normal state of charge within a reasonably short time. This action may be accomplished by means of the cell 10, arm 20 and appurtenant regulating apparatus. As the battery 4 becomes discharged the liquid or electrolyte in the cell 10 becomes lighter, thereby allowing the container 11, bail 17 and arm 20 to move upwardly under the action of the spring 18. When the battery has reached a predetermined condition of discharge the arm 20 will come into contact with the plate 23, so that any further discharge of the battery will cause the arm 20 to compress the blocks of the carbon pile 22, thereby decreasing the resistance in circuit with field 38 and increasing the strength of this field. Since the field 38 is now stronger than field 37 the motor 35 will be excited and this excitation will be in a direction to cause the motor to move contact point 34, so that the generator will take more load than it would under the former adjustment of the regulating apparatus 5, 6, 7, 8 and 9. That is, the contact point 34 would move to the left so that the average load upon the generator is readjusted so that the booster 5 will cause the battery to charge when there is a greater load upon the system. This action causes the battery to be brought back to its normal state of charge much sooner than would otherwise be the case. In most systems and under most conditions it would be desirable that the motor 35 operate very much slower than the regulating apparatus 5, 6, 7, 8 and 9. In order to make this action considerably slower and as slow as desired the shaft 36 is provided with a fan 39 which acts as a resistance to the speeding up of the motor.

If the battery should receive a charging current of a considerable length of time and become overcharged the liquid or electrolyte in the container 11 would become heavier, thereby causing the arm 20 to move downwardly in opposition to the spring 18. When this action has reached a certain point indicated by a certain state of overcharge of the battery the arm 20 contacts with plate 28 and any further overcharge of the battery causes the arm 20 to compress the blocks of the carbon pile resistance 29, thereby increasing the strength of field 37, so that the motor 35 is caused to rotate in an opposite direction. This causes the contact point 34 to move to the right, thereby decreasing the average load which would ordinarily fall upon the generator so that the booster voltage will be varied to cause the battery to discharge sooner than would otherwise be the case, and thereby restore the battery substantially to its normal condition.

By arranging the plates 23 and 28 at some distance from the arm 20 when the battery is in its normal state of charge the battery is allowed to depart from this normal state of charge within certain predetermined limits. These limits may be adjusted to anything desired by altering the positions of the plates 23 and 28 or the plates 27 and 33, or by changing the tension of the spring 18 and the weight of the container 11. In order that the condition of the state of charge of the battery may be indicated visually I provide a scale 40 arranged back of the arm 20, so that as the arm 20 moves its position may be registered, and thereby the state of charge of the battery may be registered. It will, therefore, appear that as variations in the difference of weight between the electrolyte with its container and the plates 12 occur, that the arm 20 is moved responsively thereto, so that the condition of charge of the storage battery is suitably indicated, and furthermore the action of the regulating apparatus 5, 6, 7, 8 and 9 is so altered and the average load of the generator 1 so changed that with the ordinary fluctuations of the system the battery is caused or tends to be caused to be returned to a predetermined condition or state of charge.

Referring to Fig. 2, I there show a system similar to Fig. 1 provided with a main generator 41, supplying mains 42 which feed lamps or other translating devices 44. Connected across the mains 42 is a storage battery 45 and booster 46. The booster is provided with a field 47 connected across the mains 42 in series with a counter machine 48. The counter machine 48 is provided with a field 49 connected in shunt about a resistance 50 in the main circuit 42. The operation of the system so far described is exactly the same as that of Fig. 1. At 51 is shown one of the cells of the storage battery 45, this cell consisting of a suitable container 52 for the liquid or electrolyte and plates 53. The plates 53 are suspended or supported in exactly the same manner as those shown in Fig. 1 by means of an arm 54 and support 55. The container 52 is also supported in a similar manner by means of a bail 56, and spring 58. A scale 59 is also provided in operative relation with the arm 57 for similarly indicating the condition of charge or discharge of the storage battery 45. In order that variations in the condition of the cell 51 may cause the average load on the generator 41 to be varied the counter machine 48 is provided with a normally constant field 60, connected across the mains 42.

In series with the field 60 is a variable resistance 61 controlled by a movable contact arm 62 operated by a worm 63 driven by a motor 64. The motor 64 is connected to the mains 42 and is provided with two series opposing field coils 65 and 66. In series with the field coil 65 is a carbon pile resistance 67 similar to the carbon pile resistance 29 already described, and in series with the field 66 is a carbon pile resistance 68 similar to the resistance 22 already described. The carbon pile resistances 67 and 68 are provided with actuating rods 69 and plates 70. About the rods 69 are coil springs 71 which engage the plates 70 and tend to force them toward the arm 57 to release the pressure on the carbon piles 67 and 68. Springs 71 abut fixed members 72 and plates 73 are secured to the rods 69 and arranged to limit the expansion of the carbon piles 67 and 68 by coming into contact with the fixed members 72.

The operation of the modification shown in Fig. 2 is similar to that shown in Fig. 1 with the exception that the apparatus will regulate responsive to changes in the condition or state of charge of the battery, directly upon the counter machine 48 instead of upon the resistance 50. That is, as the battery discharges the electrolyte in cell 51 grows lighter, thereby causing the arm 57 to move upwardly thus increasing the effectiveness of field 66 and causing the motor 64 to rotate in a direction to decrease the booster discharge voltage or increase the booster charging voltage. If the cell 51 of the battery 45 becomes overcharged the electrolyte becomes heavier, thereby causing the arm 57 to move downwardly, compressing the carbon pile resistance 67, increasing the effectiveness of field 65 and causing the motor 64 to rotate in the opposite direction to increase the booster discharge voltage and decrease the booster charging voltage. These actions cause the battery to tend to return to its normal condition or state of charge. As shown in Fig. 2 the plates 70 are both arranged to contact with the arm 57 when the battery is in its normal condition of charge. Any variation whatever from this predetermined condition of charge will cause the motor 65 to operate and thereby tend to restore the battery to this predetermined condition of charge. In the system shown in Fig. 1 the battery was allowed to depart from this predetermined or normal condition of charge to within certain limits, which were set as above described. In order that the battery may have sufficient time to discharge or charge in accordance with the needs thereof and of the system I have added a fan 74 to the shaft of the motor 64, which fan causes the motor to act much slower than would otherwise be the case, so that the regulating apparatus 46, 47, 48, 49 and 50 have sufficient time to produce their proper regulating action before the counter or opposing action of the remaining regulating apparatus is brought into effect or has time to become sufficiently effective to cut down the action of the booster 46.

Although I have described my improvements in great detail nevertheless I do not desire to be limited thereto except as specified hereinafter in the claims, since many changes and modifications within the scope and spirit of my invention will be apparent to those skilled in the art. But Having fully and clearly described my improvements, what I claim as new and desire to secure by Letters Patent, is:

1. In an electrical system of distribution, a distribution circuit, a compensatory storage battery in operative relation thereto, means for regulating the charge and discharge of the battery responsive to variations in the electrical condition of the system, and means responsive to variations in the weight of the liquid of the cells of said battery for further regulating the battery action.

2. In an electrical system of distribution, a distribution circuit, a compensatory storage battery in operative relation thereo, means for regulating the charge and discharge of the battery responsive to variations in the electrical condition of the system, and means responsive to variations in the weight of the liquid of one of the cells of said battery, said means being arranged to restore the battery to a predetermined condition of charge.

3. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and means for regulating the action of said controlling means responsive to variations in the weight of the liquid of one of the cells of said battery.

4. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and means acting to cause the battery to return substantially to a predetermined condition of state of charge, responsive to variations in the weight of the liquid in one of the cells of said battery.

5. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and slower acting means for cutting down the action of said controlling means responsive to variations in the weight of the liquid in one of the cells of said battery.

6. In an electrical system of distribution, a distribution circuit, a compensatory storage battery in operative relation thereto, means for regulating the charge and discharge of the battery, and means for opposing or cutting down the action of said regulating means responsive to variations in the weight of the liquid in one of the cells of said storage battery.

7. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and means for regulating the action of said controlling means responsive to variations in the weight of the liquid of one of the cells of said battery, and means operatively related with said regulating means for indicating the state of charge of the battery.

8. In an electrical system of distribution, a main generator, a circuit and its load supplied thereby, a compensatory storage battery connected thereto, a booster and regulating apparatus for controlling the charge and discharge of the battery responsive to variations in the load on said circuit, and means for regulating the action of said controlling apparatus responsive to variations in the weight of the liquid in one of the cells of the storage battery.

9. In an electrical system of distribution, a source of electrical energy, a distribution circuit and its load connected thereto, a storage battery operatively related thereto, one cell of the battery with its container, liquid and plates, having the plates separately and independently supported from the container and liquid, and means actuated responsive to variations in the weight of the liquid for regulating the division of load between the source and battery.

10. In an electrical system of distribution, a source of electrical energy, a distribution circuit and its load connected thereto, a storage battery operatively related thereto, one cell of the battery with its container, liquid and plates having means for resiliently supporting the container with respect to the plates, a member actuated to move responsive to variations in the weight of said liquid, a scale indicating the condition of said cell by the position of said member with respect to the scale, and means controlled by said member for regulating the division of load between the source and battery.

11. In an electrical system of distribution, a source of electrical energy, a distribution circuit and its load connected thereto, a storage battery operatively related thereto, one cell of the battery with its container, liquid and plates, having means for resiliently supporting the container, a pivoted member operated by changes in the weight of said liquid, and means controlled by said member for regulating the division of load between the source and battery.

12. In an electrical system of distribution, a main generator, a circuit and its load supplied thereby, a compensatory storage battery in operative relation therewith, a booster and regulating apparatus for controlling the charge and discharge of the battery responsive to load variations on said circuit, a motor for regulating the action of said controlling apparatus, and means for causing said motor to rotate in one direction or the other in accordance with an increase or decrease in the weight of the liquid of one of the cells of the storage battery, said last mentioned means including a movable means including a movable member operated responsive to the change in weight of said liquid and two carbon pile resistances controlling the field excitation of said motor and controlled by said movable member.

13. In an electrical system of distribution, a source of electrical energy, a supply circuit in operative relation thereto, a storage battery in operative relation with the supply circuit to be charged therefrom, means for controlling the charge and discharge of said battery, and means for regulating the action of said controlling means to cause the battery to assume a predetermined condition or state of charge responsive to variations in the weight of the liquid in one of the cells.

14. In an electrical system of distribution, a source of electrical energy, a supply circuit in operative relation thereto, a storage battery in operative relation with the supply circuit to be charged therefrom, means for controlling the charge and discharge of said battery, and means for regulating the action of said controlling means to cause the battery to assume a predetermined condition or state of charge as the weight of the liquid in one of the cells varies, said regulating means embracing a member moved by variations in the weight of the liquid and a scale coöperating with said member to indicate the state of charge of the battery.

15. The combination of a storage battery, means for controlling the charge and discharge of said battery and means for regulating the action of said controlling means to cause the battery to assume a predetermined condition of state of charge as the weight of the liquid of one of the cells of said storage battery varies, said regulating means embracing a member moved by variations in the weight of the liquid and a scale coöperating with said member to indicate the state of charge of the battery.

In testimony whereof, I have signed my name to this specification, in the presence of two subscribing witnesses.

ALBERT S. HUBBARD.

Witnesses:
GORHAM CROSBY,
EDWIN SEGER.